United States Patent Office 3,011,966
Patented Dec. 5, 1961

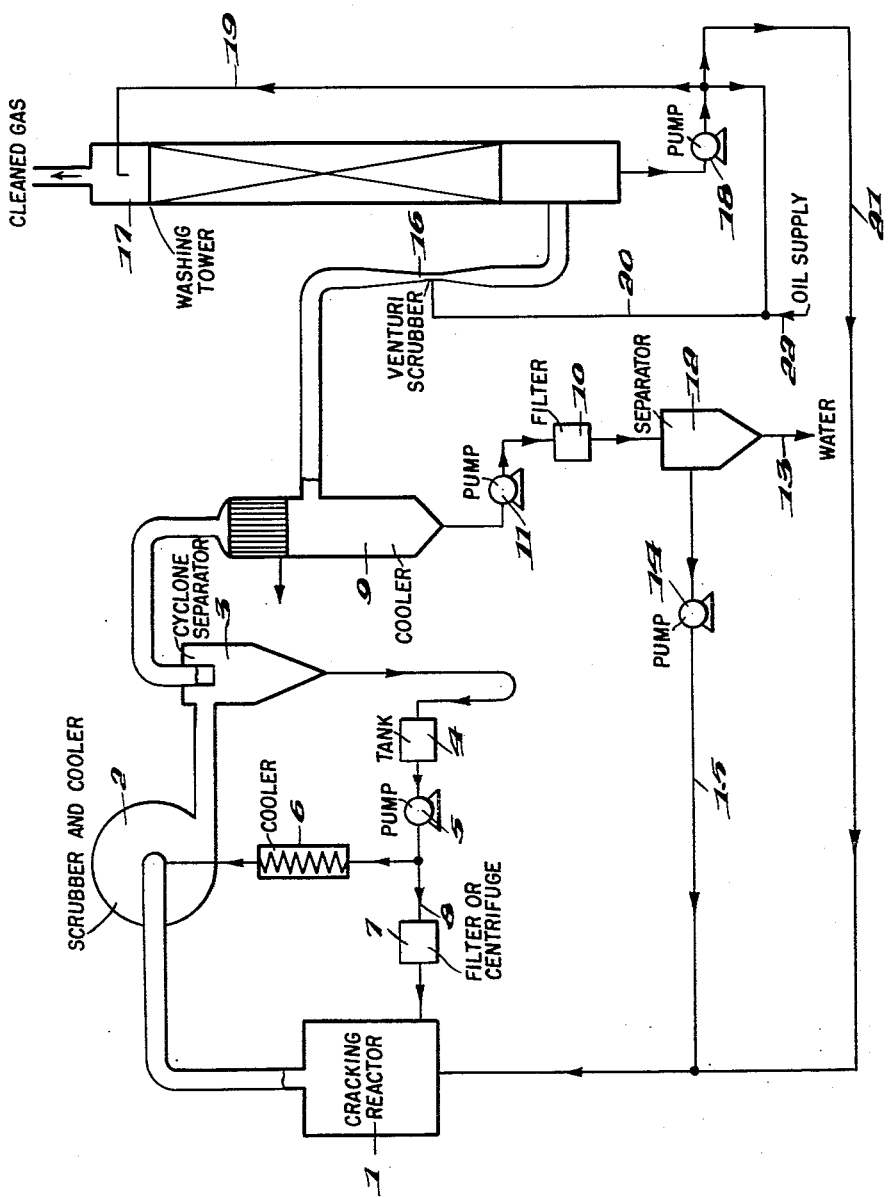

3,011,966
PURIFICATION OF CRACKED
HYDROCARBON GASES
Walter Jahnentz, Herbert Schmidt, and Richard Hilgert, all of Marl, Kreis Recklinghausen, Germany, assignors to Chemische Werke Huls Aktiengesellschaft, Marl, Kreis Recklinghausen, Germany, a corporation of Germany
Filed May 15, 1958, Ser. No. 735,454
Claims priority, application Germany May 16, 1957
15 Claims. (Cl. 208—81)

In our application Serial No. 693,409, filed Oct. 30, 1957, which corresponds to German application No. C 13 965 IVc/26 d, filed in Germany on Nov. 15, 1956, we have disclosed a method of purifying gases obtained by cracking liquid hydrocarbons in which the liquid hydrocarbons to be cracked are first used for the separation of soot, hydrocarbon mist and unsaturated polymerizable compounds, particularly higher acetylenes, from the cracked gases in a washing operation involving the use of one or more scrubbers. Thus the cracked gases can also be brought to the operating temperature of the next step by direct cooling by contact with the hydrocarbons to be cracked.

If the cracked gases contain steam this washing process faces trouble. During the cooling of the gases in the scrubbing installation, the water becomes condensed and is returned to the cracking reactor together with the hydrocarbons which have been used as washing liquid. An inconvenient accumulation of water appears in the cracking reactor and a disturbing formation of emulsions in the washing step follows. Particularly disturbing is the influence of the water during the cracking of oil which shows a strong tendency to emulsification. Due to this tendency to emulsification and the high density of such oils no satisfactory settling of the water can be attained and the installation of settling tanks in the oil circulation of the washing steps offers no improvement. The soot washed out of the gas in the scrubbers bars, likewise, a satisfactory settling of the water since it accumulates in the boundary layer between oil and water and thus interferes with the operation of the separating apparatus.

It has been found that this trouble can be avoided if the bulk of the soot is separated from the gas at temperatures which exceed the point of condensation of the steam in the cracked gas, whereupon, prior to the subsequent additional scrubbing operation, the steam is removed from the cracked gas by condensation by indirect cooling.

Since in the first scrubbing step, separating efficiency of up to 95% of soot is feasible, only insignificant quantities of soot are removed from the gas in the indirect cooler together with water and, under certain circumstances, with liquid hydrocarbons which can easily be separated from water.

Said slight quantities of soot are easily separated from the liquid mixture by filtering or centrifuging. According to the invention this process provides for the separation of water from the cracked gases without causing any troubles in operating the apparatus for the removal of the water.

The cooling of the cracked gases and the condensation of the steam in the indirect cooler are followed by the additional scrubbing step wherein the hydrocarbon to be cracked is used as washing liquid and in which the soot still contained in the cracked gas as well as hydrocarbon mist newly formed by the condensation of the hydrocarbon vapors contained in the cracked gas will be removed.

Then the cracked gas, free from soot and hydrocarbon mist and cooled to the operating temperature of the subsequent processing step, leaves the scrubbing installation.

If the cracking installation is operated at a temperature which is considerably higher than the point of condensation of the steam contained in the cracked gas, it has been found to be advantageous to perform the cooling of the gas in two steps.

In the first step the gas is cooled to a temperature which is close to about 5° C. above the point of condensation of the steam, at which temperature the first scrubbing step is operated for separation of the soot. In the second cooling step, the steam and the hydrocarbon vapors, still remaining in the gas, are condensed by indirect cooling. The first cooling step is advantageously combined with the first scrubbing step, wherein the cracked gas is cooled by direct action of the washing liquid. Simultaneously the hydrocarbon vapors condensed from the cracked gas are absorbed by the washing liquid. The hydrocarbons which are supplied subsequently to the cracking reactor serve as washing liquid. However, even the hydrocarbons condensed by the direct cooling of the cracked gases, either alone or in combination with more or less of the fresh hydrocarbons to be cracked, can be used for washing. This operating system, particularly when crude oils are used as hydrocarbons to be cracked, shows the advantages that in the first cooling step operated at a temperature lying above the point of condensation of the steam contained in the cracked gas, a medium fraction of the crude oil is condensed.

This fraction is free from the high boiling components of the crude oil and its viscosity is, therefore, considerably lower and it can better be distributed in the scrubber than the crude oils. Since the light components of the crude oil taken along from the cracking reactor do not condense at the elevated temperature of the first direct cooling step (70–90° C.), but only in the second indirect cooling step together with the steam, the hydrocarbons, condensed in the direct first cooling step, contain no or only insignificant amounts of the light hydrocarbon.

After their enrichment with soot, the hydrocarbons, condensed in the first scrubbing step, are supplied again to the cracking reactor. It is advantageous to remove the soot before it enters the cracking reactor by filtering or other appropriate measures. This is, in particular, advantageous in the cracking of crude oil, wherein the removal of soot involves considerable difficulties, while the separation of the soot from the hydrocarbons which are condensed in the first scrubbing step, does not cause any technical difficulties.

Scrubbers wherein the washing liquid is well distributed by means of a high velocity of the gas and/or of the liquid were found to be most suitable for operation of the process described above. Due to the high relative velocity between washing liquid and cracked gas in the scrubber as well as due to the high turbulence of the gas in the scrubber, the components to be eliminated are brought into intimate contact with the washing liquid and are absorbed or wetted thereby, and as a result they easily agglomerate and then can be practically completely separated by the use of known devices. If there is a sufficient pressure head of the cracked gas then a Venturi washer can be used for example as a particularly effective scrubber. If a suction blower is used to overcome the resistances of the ducts and apparatus, a scrubber design which simultaneously serves for the gas transportation, can be used. At low operating temperatures and high viscosity of the washing liquid it is preferable to use rotary centrifugal absorbers according to Piazza and Ricardo, since this type of scrubber permits operation even with very viscous washing liquids.

It is recommended to connect the scrubber, prior to indirect cooling, with a device, e.g. a cyclone, to separate from the cracked gas the washing oil drops distributed in said gas and loaded with soot by the scrubber. This separator is, likewise, operated at a temperature which is higher than the point of condensation of the steam contained in the cracked gas.

If the liquid hydrocarbon is cracked in vacuum, the first scrubbing stage operated above the point of condensation of the steam contained in the cracked gas, can be used for producing the vacuum needed for cracking. In this case vacuum pumps operated by liquid hydrocarbons are used, such as liquid ring pumps and liquid jet pumps or other expedient types. The vacuum pump serving simultaneously as scrubbing stage is operated at such a temperature that the temperature of the cracked gas compressed to standard pressure or to the operating pressure of the following-on process step exceeds the point of condensation of the steam contained in the cracked gas, and thus no condensation of steam occurs in the liquid circulation of the vacuum pump. The hydrocarbon mixture to be cracked can be used as washing and sealing liquid. Under some circumstances, however, it is convenient to operate the vacuum pump with the hydrocarbons condensed by direct cooling of the cracked gas.

An advantageous feature of the invention will be explained with reference to the accompanying drawing.

Liquid hydrocarbons are cracked in the reactor 1 of the cracking plant. Due to the burning of hydrocarbons with or without the introduction of steam into the cracking reactor 1, the cracked gas contains steam. The cracking reactor 1 is usually operated at temperatures which exceed the point of condensation of water contained in the cracked gas. For example it may be advantageous to operate the cracking installation under such conditions that the temperature of the cracked gas amounts to several hundred degrees centigrade. At this temperature the cracked gas is supplied to the first scrubbing step 2 which is simultaneously used as first cooling step.

The first scrubber 2 is designed as a blower into which liquid hydrocarbons are introduced as washing liquid. However, any other type of scrubber can be used wherein by a high relative velocity between the washing liquid the cracked gas, as well as due to a violent turbulence of the gas in the scrubber the components of the cracked gas to be removed are brought into intimate contact with the droplets of the washing liquid and wetted and absorbed thereby.

Liquid hydrocarbons are passed from the tank 4 through the pump 5 and the cooler 6 and sprayed as washing liquid into the blower 2. They are finely dispersed in the rapidly flowing gas stream which results in a satisfactory separation of soot contained in the cracked gas and in a good heat transfer between gas and washing liquid.

With the help of the cooler 6 the temperature of the washing liquid supplied to the blower 2 is so regulated that the cracked gas is cooled to close above the point of condensation of the steam contained therein.

After leaving the blower 2 the cracked gas is conveyed to the cyclone separator 3 which separates from the gas the fine droplets of the washing liquid loaded with soot. The separated washing liquid loaded with soot flows back through a trapped pipe to the tank 4. As washing liquid for the first scrubbing stage comprising the apparatus 2, 3, 4, 5 and 6 there can be used liquid or vaporous hydrocarbons taken along from the cracking reactor 1 which are condensed and separated in the first scrubbing stage. This process is particularly advantageous when the cracking installation is operated at very high temperatures and thus large quantities of hydrocarbons are distilled over and entrained with the cracked gas. In this case, with the large supply of washing liquid, no excessively high soot concentration is obtained in the washing liquid so that its circulation can be performed without trouble.

A quantity of washing liquid equal to that condensed from the cracked gas in the first scrubbing stage, is returned to the reactor 1 through the line 8 wherein, according to the invention, the soot contained in said washing liquid can be removed in the centrifuge or filter 7. That is particularly expedient if a crude oil is to be cracked in the reactor 1, for which the separation of the soot would involve very great difficulties. Therefore, for maintenance of the soot concentration desired in the cracking installation, large quantities of oil must be taken off from the circulation and rejected. In this case a considerable portion of the soot formed in the reactor 1 can be removed from the washing liquid of the first scrubbing step. Due to the absence of high-boiling, pitchy components in the hydrocarbons, condensed in the first scrubbing step, the soot can easily be separated therefrom.

However, it is also feasible to supply fresh hydrocarbons to be cracked in addition to the condensed hydrocarbons, carried along from the reactor 1. This is particularly expedient if the cracking installation is operated at such a low temperature that when using as washing liquid only those hydrocarbons condensed in the first scrubbing step, an exceedingly high soot concentration is obtained, or if due to the use of readily filterable hydrocarbons for cracking, the soot separation therefrom does not cause any trouble.

After separating the bulk of the soot contained in the cracked gas in the first scrubbing step and cooling the cracked gas to a temperature lying close above the point of condensation of the steam contained in said cracked gas, the cracked gases are supplied to the second cooling step.

In the indirect cooler 9 the cracked gas is cooled to the lowest possible temperature, and steam as well as the still uncondensed hydrocarbons precipitate. This water-hydrocarbon mixture is conveyed by the pump 11 to the separating tank 12. During the condensation of the steam and hydrocarbon vapors in the cooler 9 the soot particles still contained in the cracked gas act as condensation nuclei and precipitate simultaneously. Thus, the liquid mixture running from the cooler 9 always contains a slight quantity of soot which is well wetted by the hydrocarbons. The filter 10 or other appropriate apparatus removes the soot from the mixture and thus a perfect and trouble-free operation of the separating tank 12 is secured. The upper liquid layer formed from the condensed hydrocarbons in the separating tank is reconveyed to the reactor 1 through the pump 14 and the pipe 15 while the water settled at the bottom is discharged through the pipe 13 and rejected from the cracking plant.

Inasmuch as very fine hydrocarbon mist is formed again by the indirect cooling of the cracked gas and the soot content of the cracked gas is still too high, said gas is supplied to a second scrubbing step. For this purpose the scrubber 16 is designed as a Venturi washer but any other appropriate scrubbing device could be used. Hydrocarbons to be cracked are supplied as washing liquid through pipe 20 to the Venturi washer 16. The washing liquid entering the throat of the Venturi washer 16 through spray holes in the tube wall is finely atomized by the gas passing through the throat at high velocity and the atomized spray will take the soot out of the cracked gas practically completely. In this second scrubbing step any degree of purity of the cracked gas required for the further processing can be attained by providing a sufficiently high gas velocity in the throat of the Venturi washer 16 and using an adequately large quantity of washing liquid.

Then the cracked gas is introduced tangentially at high velocity into the lower part of the washing tower 17 whereby the bulk of the fine droplets of the washing liquid loaded with soot is separated from the cracked gas. When the cracked gas passes through the packed washing tower 17 supplied with washing liquid through the pipe 19 even the residual droplets which have been formed in the scrubber 16 are removed from the cracked gas.

Since the hydrocarbons to be cracked are used as washing liquid in the apparatus 16 and 17 and since the quantity thereof, besides supplying the Venturi washer 16, is not sufficient for a satisfactory irrigation of the packing of the washing tower 17, the washing liquid from the sump of the washing tower 17 is recycled by the pump 18 through the pipes 19 and 20 to the Venturi-washer 16 and the washing tower 17. The same amount of hydrocarbon to be cracked as is supplied through the pipe 22 from a storage tank (not shown) to the circulation of the washing liquid of the second scrubbing step consisting of the apparatus 16 and 17, passes through the pipe 21 to the reactor 1 for cracking.

Under some circumstances it may be advantageous to install a bubble tray column on the washing tower 17 as terminal washing device and to introduce the fresh liquid hydrocarbons through this column into the washing tower 17 in countercurrent to the cracked gas. The disturbing unsaturated polymerizable compounds, particularly higher acetylenes, absorbed by the liquid hydrocarbons to be cracked used as washing liquid, are conveyed to the reactor 1 together with said liquid hydrocarbons and are polymerized at the elevated temperature prevailing there whereupon they separate in flakes and can be removed together with the soot.

The invention is illustrated by the following example.

In an installation for cracking liquid hydrocarbons by the process according to the British Patent No. 364,418, a crude oil having a boiling range between 50° C. and more than 40° C. and a density $d_{20} = 0.874$ is cracked and thereby cracked gas containing acetylene is produced at the rate of 21.8 standard cu. m. per hour. The cracked gas leaves the reactor 1 at a temperature of 150° C. The dew point of the steam contained therein amounts to 67° C. It contains soot in an amount of about 2.5 g. per standard cu. m. and hydrocarbon vapors and entrained liquid hydrocarbons in an amount of about 200 g. per standard cu. m. In the first scrubber 2, which is operated as a liquid charged blower, the gas is cooled down to a temperature of 70° C. and the soot content is reduced to 75 mg. per standard cu. m. The liquid hydrocarbons serving as washing liquid, sprayed and loaded with soot in the preceding blower 2, are separated from the cracked gases together with the condensed components of the hydrocarbon vapors contained in said gases in the cyclone separator 3 and delivered to the tank 4 from which they are recycled at a rate of about 500 l. per hour by the pump 5 through the cooler 6 to the blower 2. By means of the cooler 6 the temperature of the oil circulation is maintained at 70° C., so that the temperature of the gas leaving the scrubbing step exceeds the point of condensation of the steam by about 3° C.

To maintain a constant quantity of washing liquid in the first scrubbing stage (2, 3, 4, 5 and 6) a quantity of washing liquid loaded with soot equal to that of hydrocarbon vapors condensed in the scrubber 2, is returned through the filter press 7 and the line 8 to the reactor 1. The filter cake accumulated in the filter press 7 contains 70% of liquid hydrocarbons and is removed periodically. Thus a soot content of 16 g. per l. is obtained in the washing liquid and by this concentration of soot a perfect and trouble-free operation of the plant is still secured. The boiling range of the washing liquid amounts to 160°–340° C., its viscosity 1.1 cp. at 70° C. Considering these properties, the filterability of the soot-laden liquid hydrocarbon is good. The cracked gas, freed from the bulk of soot but still having a soot content of 75 mg. per standard cu. m., is conveyed from the cyclone separator 3 into the indirect water cooler 9 wherein it is cooled to a temperature of 21° C. Water is condensed at the rate of 4.6 kilos per hour and hydrocarbons having a boiling range between 50° and 200° C. and a density of 0.765 at 20° C. are condensed at the rate of 2.0 kilos per hour.

By condensing steam and hydrocarbon vapors in the cooler 9 ¼ of the soot still contained in the cracked gas, i.e. about 20 mg. per standard cu. m., is precipitated. The mixture of light hydrocarbons, water and soot, accumulated in the cooler 9 is conveyed by the geared pump 11 through the Scheibler filter 10 where the soot is retained. In the separating tank 12 water is separated and discharged through the pipe 13. The light hydrocarbons separated from the water are returned to the reactor 1, through the pump 14 and the pipe 15. Since the mixture of water and light hydrocarbons in the settling tank is soot-free and a considerable density difference exists between the two liquids, they are perfectly separated.

Then the cracked gas is conveyed from the indirect cooler 9 to the Venturi washer 16 wherein the soot still contained in the cracked gas is removed down to a concentration of 3.5 mg. per standard cu. m. and the hydrocarbon mist formed by the cooling of the cracked gas to a temperature of 21° C. is condensed to drops of liquid large enough to be removed from the gas stream by centrifugal force.

The washing liquid used in the Venturi washer 16 is subsequently removed from the gas in the oil-irrigated packed column 17. The hydrocarbon mixture to be cracked which flows through the pipe 22 is used as washing liquid for the packed column 17 and the Venturi washer 16. The hydrocarbon mixture from the sump of the column 17 is recycled by the pump 18 through the pipes 19 and 20 to the head of the column 17 and to the Venturi washer 16. The consumption of washing liquid amounts to 200 l. per hour for the column and 40 l. per hour for the Venturi washer. A quantity of the washing liquid circulating in the second scrubbing step (16, 17 and 18) equal to the quantity of hydrocarbons to be cracked which is supplied through the pipe 22, is conveyed through the pipe 21 to the reactor 1. The cracked gas leaves the packed column 17 with a soot content of 3.0 mg. per standard cu. m. and is saturated with steam at a temperature of 21° C. Tar mist as well as sprayed hydrocarbon drops are removed quantitatively from the gas. Unsaturated polymerizable compounds, in particular higher acetylenes, absorbed by the washing liquid are returned to the reactor 1 where they polymerize and then they can be removed from the oil together with the soot formed in cracking. In the washing liquid circulation of the second scrubbing stage (16, 17 and 18), there appears a soot content of less than 1 g. per l. as well as a content of polymerizable compounds of about 3 g. per l. These concentrations give a trouble-free operation of the plant.

We claim:

1. Process of purifying gases containing acetylene and obtained by cracking liquid hydrocarbons under acetylene forming conditions in a reaction zone from soot, hydrocarbon mists, steam and polymerizable higher acetylenes which consists in first scrubbing said gases leaving said reaction zone with the liquid hydrocarbons to be cracked at a temperature above the point of condensation of the water vapor contained in said gases in a washing zone with at least one scrubbing section, delivering at least a part of the contaminated liquid hydrocarbons from said washing zone to said reaction zone, then removing from said gases the water vapor by condensation together with additional soot and condensable hydrocarbons not condensed in said scrubbing by indirect cooling and thereafter subjecting the gases to further scrubbing.

2. Process according to claim 1 in which the first scrubbing step which precedes the indirect cooling effects simultaneously a direct cooling of the hot cracked gases to a temperature which is about 5° C., above the point of condensation of the steam contained in the cracked gases.

3. Process according to claim 1 in which the contaminated hydrocarbons condensed in the first scrubbing step are at least partially used as washing liquid in said first scrubbing step and then returned to the reaction zone.

4. Process according to claim 3 in which the soot is removed from the contaminated hydrocarbons before conveying them to the reaction zone.

5. Process according to claim 1 in which the soot contained in the mixture of water and hydrocarbons separated by said condensation is removed prior to the separation of water.

6. Apparatus for purifying gases containing soot, hydrocarbon mist and disturbing unsaturated polymerizable compounds formed by cracking liquid hydrocarbons in the liquid phase by means of a reactor, which comprises a washing apparatus consisting of at least one scrubber to be operated with the hydrocarbons to be cracked as washing liquid and at least one separator for removing from the gases hydrocarbon droplets formed in the scrubber, means for conveying gases from said reactor to said washing apparatus, means for supplying the liquid hydrocarbons to be cracked to said washing apparatus, means for collecting the contaminated liquid hydrocarbons from said first washing apparatus, means for delivering the contaminated liquid hydrocarbons back to said first washing apparatus and to said reactor, and indirect cooler with a connected separator tank for separating light liquid hydrocarbons and water both condensed in said indirect cooler, means for conveying gases from said washing apparatus to said indirect cooler, means for delivering the mixture of light liquid hydrocarbons and water, both condensed in said indirect cooler, from said indirect cooler to said separating tank, means for delivering the separated light liquid hydrocarbons from said separating tank back to said reactor, a further washing apparatus consisting of a scrubber and a separator for removing from the gases the hydrocarbon droplets formed in the indirect cooler by condensing hydrocarbon vapors and in the scrubber by atomizing liquid hydrocarbons, means for conveying gases from said indirect cooler to said further washing apparatus, means for supplying the liquid hydrocarbons to be cracked to said further washing apparatus, means for collecting the contaminated liquid hydrocarbons from said further washing apparatus and means for delivering the contaminated liquid hydrocarbons back to said further washing apparatus and to said reactor.

7. Apparatus for purifying gases containing soot, hydrocarbon mist and disturbing unsaturated polymerizable compounds formed by cracking liquid hydrocarbons in the liquid phase by means of a reactor, which comprises a blower to be operated with liquid hydrocarbons to be cracked as washing liquid, means for conveying gases from said reactor to said blower, a cyclone separator, means for conveying gases from said blower to said cyclone separator for removing from the gases hydrocarbon droplets formed in the blower, means for supplying the liquid hydrocarbons to be cracked to said blower, means for collecting the contaminated liquid hydrocarbons from said blower and cyclone separator, means for delivering the contaminated liquid hydrocarbons back to said blower and to said reactor, an indirect cooler with a separating tank connected to it, means for conveying gases from said cyclone separator to said indirect cooler, means for delivering the mixture of condensed steam and hydrocarbon vapors from said indirect cooler to said separating tank, means for delivering the separated light liquid hydrocarbons from said separating tank back to said reactor, a Venturi washer, means for conveying gases from said indirect cooler to said Venturi washer, a packed washing tower, means for conveying gases from said Venturi washer to said packed washing tower, means for supplying the liquid hydrocarbons to be cracked to said Venturi washer and packed washing tower, means for collecting the contaminated liquid hydrocarbons from said Venturi washer and packed washing tower and means for delivering the contaminated liquid hydrocarbons back to said Venturi washer and packed washing tower and to said reactor.

8. Apparatus for purifying gases containing soot, hydrocarbon mist and disturbing unsaturated polymerizable compounds formed by cracking liquid hydrocarbons in the liquid phase by means of a reactor, which comprises a vacuum pump to be operated with the liquid hydrocarbons to be cracked as washing and sealing liquid, means for conveying gases from said reactor to said vacuum pump, a cyclone separator for removing from the gases hydrocarbon droplets formed in the vacuum pump, means for supplying the liquid hydrocarbons to be cracked to said vacuum pump, means for collecting the contaminated liquid hydrocarbons from said vacuum pump and cyclone separator, means for delivering the contaminated liquid hydrocarbons back to said vacuum pump and to said reactor, an indirect cooler with a separating tank connected to it, means for conveying gases from said cyclone separator to said indirect cooler, means for delivering the mixture of condensed steam and hydrocarbon vapors from said indirect cooler to said separating tank, means for delivering the separated light liquid hydrocarbons from said separating tank back to said reactor, a Venturi washer, means for conveying gases from said indirect cooler to said Venturi washer, a packed washing tower, means for conveying gases from said Venturi washer to said packed washing tower, means for supplying the liquid hydrocarbons to be cracked to said Venturi washer and packed washing tower, means for collecting the contaminated liquid hydrocarbons from said Venturi washer and packed washing tower and means for delivering the contaminated liquid hydrocarbons back to said Venturi washer and packed washing tower and to said reactor.

9. Apparatus for purifying gases as defined in claim 6, which comprises means for cooling the collected contaminated liquid hydrocarbons to be recycled to said first washing apparatus.

10. Apparatus for purifying gases as defined in claim 7, which comprises means for cooling the collected contaminated liquid hydrocarbons to be recycled to said blower.

11. Apparatus for purifying gases as defined in claim 8, which comprises means for cooling the collected contaminated liquid hydrocarbons to be recycled to said vacuum pump.

12. Apparatus for purifying gases as defined in claim 6, which comprises means for removing soot from the contaminated liquid hydrocarbons to be delivered from the separator connected with said first washing apparatus to said reactor.

13. Apparatus for purifying gases as defined in claim 7 which comprises means for removing soot from the contaminated liquid hydrocarbons to be delivered from the cyclone separator connected with said blower to said reactor.

14. Apparatus for purifying gases as defined in claim 8 which comprises means for removing soot from the contaminated liquid hydrocarbons to be delivered from the vaccum pump connected with said blower to said reactor.

15. Apparatus for purifying gases as defined in claim 14 which comprises means for removing soot from the mixture of light liquid hydrocarbons at water condensed in said indirect cooler and to be delivered to said separating tank.

References Cited in the file of this patent

UNITED STATES PATENTS

| | | |
|---|---|---|
| 1,805,113 | Taber | May 12, 1931 |
| 1,868,204 | Herthel | July 19, 1932 |
| 1,892,452 | Dubbs | Dec. 27, 1932 |
| 2,012,959 | Colony | Sept. 3, 1935 |
| 2,026,231 | Isom | Dec. 31, 1935 |
| 2,073,456 | Sachs | Mar. 9, 1937 |
| 2,668,754 | Lichtenfels | Feb. 9, 1954 |
| 2,786,802 | Hanisian et al | Mar. 26, 1957 |